United States Patent
Zhou

(10) Patent No.: US 10,120,578 B2
(45) Date of Patent: Nov. 6, 2018

(54) STORAGE OPTIMIZATION FOR WRITE-IN-FREE-SPACE WORKLOADS

(71) Applicant: International Business Machines Corporation, Armonk, NY (US)

(72) Inventor: Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 15/409,767

(22) Filed: Jan. 19, 2017

(65) Prior Publication Data

US 2018/0203611 A1 Jul. 19, 2018

(51) Int. Cl.
*G06F 12/00* (2006.01)
*G06F 3/06* (2006.01)

(52) U.S. Cl.
CPC ........... *G06F 3/0608* (2013.01); *G06F 3/064* (2013.01); *G06F 3/067* (2013.01); *G06F 3/0652* (2013.01); *G06F 3/0659* (2013.01)

(58) Field of Classification Search
CPC ...... G06F 3/0652; G06F 3/0659; G06F 3/067; G06F 3/064; G06F 3/0608
See application file for complete search history.

(56) References Cited

U.S. PATENT DOCUMENTS

| 8,315,973 | B1 * | 11/2012 | Kaiser | G06F 3/0617 |
| | | | | 707/609 |
| 8,694,563 | B1 | 4/2014 | Cameron et al. | |
| 8,874,700 | B2 | 10/2014 | Chan et al. | |
| 2005/0050518 | A1 * | 3/2005 | Adolph | G11B 27/002 |
| | | | | 717/120 |
| 2010/0199036 | A1 | 8/2010 | Siewert et al. | |
| 2011/0219170 | A1 | 9/2011 | Frost et al. | |
| 2013/0174176 | A1 | 7/2013 | Kopylovitz | |
| 2015/0355837 | A1 | 12/2015 | Bish et al. | |
| 2016/0162205 | A1 | 6/2016 | Grimsrud | |

OTHER PUBLICATIONS

Bhadkamkar, Medha, et al., "BORG: Block-reORGanization for Self-optimizing Storage Systems," USENIX Association, 7th USENIX Conference on File and Storage Technologies, Feb. 2009.

\* cited by examiner

*Primary Examiner* — Kalpit Parikh
(74) *Attorney, Agent, or Firm* — Nelson and Nelson; Daniel P. Nelson; Alexis V. Nelson

(57) ABSTRACT

A method for optimizing data storage for write-in-free-space workloads is disclosed. In one embodiment, such a method includes receiving a write request to write an updated version of data to a new block address in free space. The new block address maps to a destination extent. The method further determines an old block address, mapping to a source extent, storing a previous version of the data. The method determines whether the source extent is the same as the destination extent. If the source extent is not the same as the destination extent (i.e., the old block address and new block address point to blocks in different extents), the method transfers temperature statistics associated with the old block address from the source extent to the destination extent. The method writes the updated version of the data to the new block address. A corresponding system and computer program product are also disclosed.

20 Claims, 7 Drawing Sheets

STORAGE OPTIMIZATION FOR WRITE-IN-FREE-SPACE WORKLOADS

BACKGROUND

Field of the Invention

This invention relates to systems and methods for optimizing storage for write-in-free-space workloads.

BACKGROUND OF THE INVENTION

In today's tiered storage architectures, the "hotness" or "coldness" of data may be continually monitored so that it can be optimally placed on storage media. For example, "hot" (i.e., frequently accessed) data may be placed on faster, more expensive storage media (e.g., solid state drives) to improve I/O performance. "Cold" (i.e., less frequently accessed) data may be placed on slower, less expensive storage media (e.g., hard disk drives) with reduced I/O performance. As the temperature of the data changes, the data may be migrated between storage tiers to optimize I/O performance.

Some complexities may arise when using different types of file systems with tiered storage architectures. The vast majority of file systems currently in use are "write in place" (WIP) file systems. Using this type of file system, when an application updates a block of data, the file system overwrites the data at the location where it resides on the underlying storage medium. Using this type of file system, the temperature of the block may be modified to reflect that is has been updated and the block may be placed (or retained) on an appropriate tier of the tiered storage architecture.

Problems arise however with less frequently used file systems such as "write in free space" (WIFS) file systems. Using this type of file system, updates to a block of data are written to a free block on the underlying storage medium as opposed to the original location of the data. The block address for the data is then updated to point to the new location on the storage medium. Among other benefits, this type of file system enables logically random writes to be coalesced into a physically sequential write on the storage medium. Unfortunately, the new location of the data may not have similar temperature characteristics to the old location, thereby causing additional complexities when determining when and where to migrate data within tiered storage architectures.

In view of the foregoing, what are needed are systems and methods to enable tiered storage systems to work with "write in free space" file systems.

SUMMARY

The invention has been developed in response to the present state of the art and, in particular, in response to the problems and needs in the art that have not yet been fully solved by currently available systems and methods. Accordingly, systems and methods are disclosed to optimize data storage for write-in-free-space workloads. The features and advantages of the invention will become more fully apparent from the following description and appended claims, or may be learned by practice of the invention as set forth hereinafter.

Consistent with the foregoing, a method for optimizing data storage for write-in-free-space workloads is disclosed. In one embodiment, such a method includes receiving a write request to write an updated version of data to a new block address in free space. The new block address maps to a destination extent. The method further determines an old block address, mapping to a source extent, storing a previous version of the data. The method determines whether the source extent is the same as the destination extent, or in other words, whether the old block address and new block address point to storage space in the same extent. If the source extent is not the same as the destination extent (i.e., the old block address and new block address point to blocks in different extents), the method transfers temperature statistics associated with the old block address from the source extent to the destination extent. The method writes the updated version of the data to the new block address.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
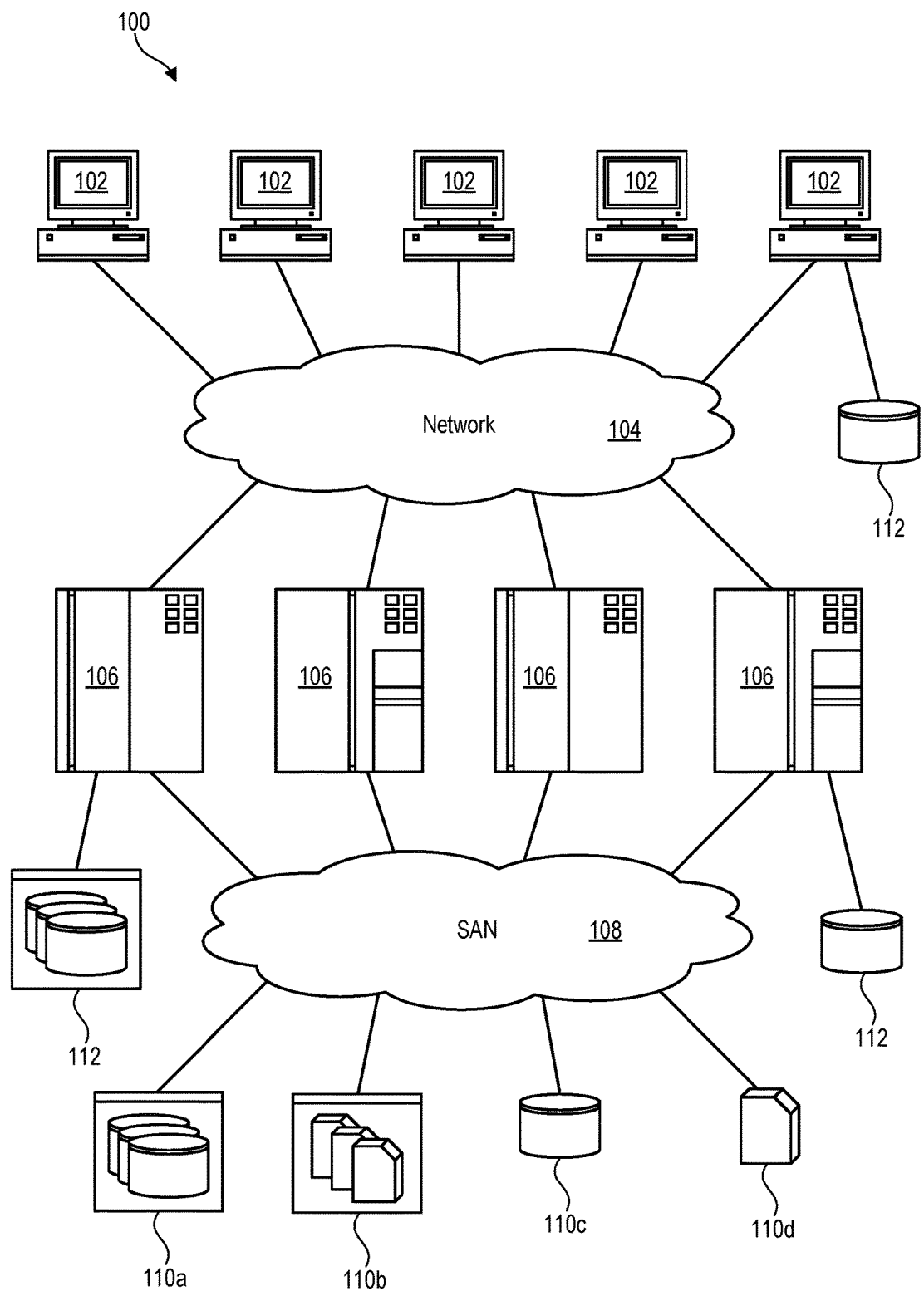
FIG. 1 is a high-level block diagram showing one example of a network environment in which a system and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment in which systems and methods in accordance with the invention may be implemented. The network environment 100 is presented by way of example and not limitation. Indeed, the systems and methods disclosed herein may be applicable to a wide variety of network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
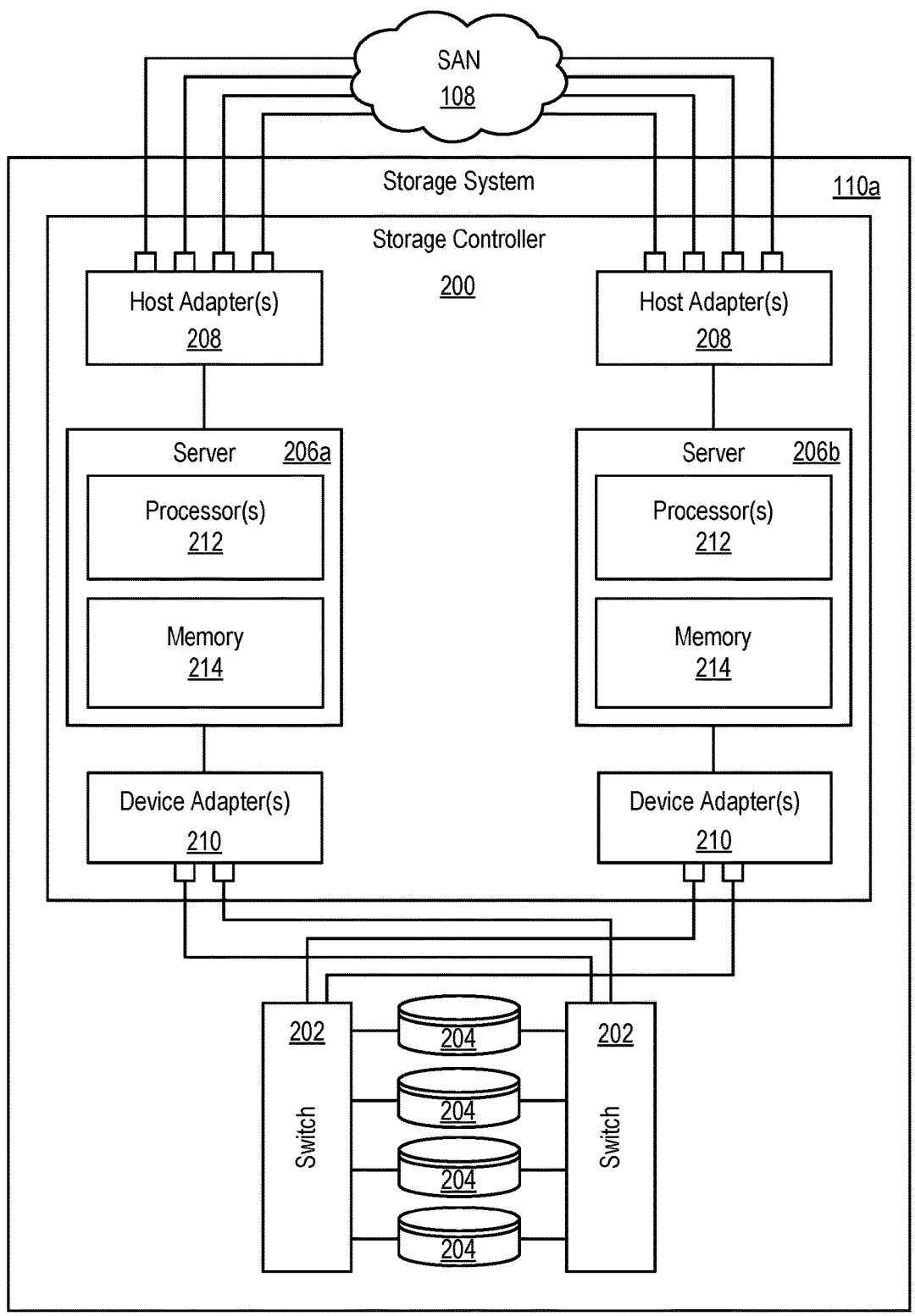
FIG. 2 is a high-level block diagram showing an example of a storage system that may include various storage tiers containing storage media of differing cost and I/O performance.

Referring to FIG. 2, one embodiment of a storage system 110a containing an array of hard-disk drives 204 and/or solid-state drives 204 is illustrated. The internal components of the storage system 110a are shown since certain functionality in accordance with the invention may be implemented within such a storage system 110a. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. The servers 206 may host at least one instance of these software modules. These software modules may manage all read and write requests to logical volumes in the storage devices 204.

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

Figure 3:
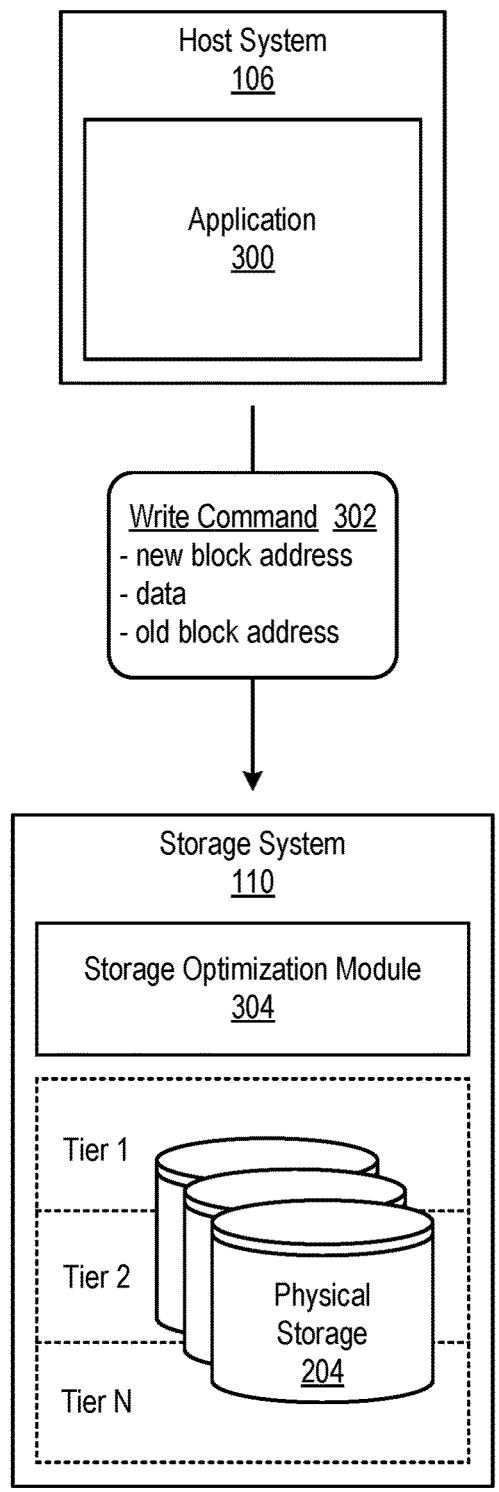
FIG. 3 is a high-level block diagram showing a new type of command and storage optimization module that may be used to optimize storage for write-in-free-space workloads.

Referring to FIG. 3, in certain cases, a storage system 110 such as that illustrated in FIG. 2 may provide various tiers of storage of differing levels of cost and I/O performance. For example, solid state drives 204 may be organized into a first storage tier, higher-performing hard disk drives 204 may be organized into a second storage tier, lower-performing hard disk drives 204 may be organized into a third storage tier, and so forth. Data migration software on the storage system 110 or host system 106 may move data between the storage tiers. For example, hotter data (i.e., more frequently accessed data) may be moved to higher performing storage tiers while colder data (i.e., less frequently accessed data) may be moved to lower performing storage tiers. As the temperature of the data changes, the data may be moved between storage tiers. In certain embodiments, movement of data between storage tiers may be hidden from a host system 106 and/or application 300 running on a host system 106.

As previously mentioned, complexities may arise when using different types of file systems with tiered storage architectures such as that illustrated in FIG. 3. For example, when using "write in free space" (WIFS) file systems, updates to a block of data are written to a free block on the underlying storage medium 204 as opposed to the original location of the data. The block address for the data is then updated to point to the new location on the storage medium 204. Unfortunately, the new location of the data may not have similar temperature characteristics to the old location, potentially causing problems or complexities when determining when and where to migrate data within the tiered storage architecture.

In order to address these problems/complexities, a write command and associated application programming interface (API)) may be expanded to include an additional parameter. A conventional write command and associated API for a "write in free space" workload may specify a new block address in free space to which particular data is to be written. This write command may be expanded to create a new write command 302 that also specifies an old block address associated with the previous version of the data, as shown in FIG. 3.

Figure 4:
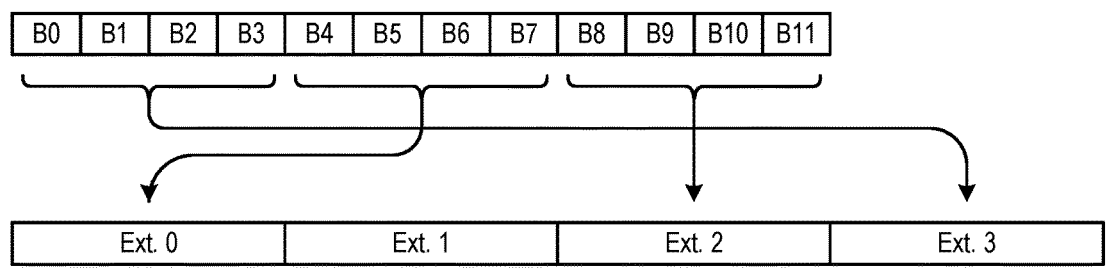
FIG. 4 is a high-level block diagram showing static mapping of blocks to extents.
Figure 5:
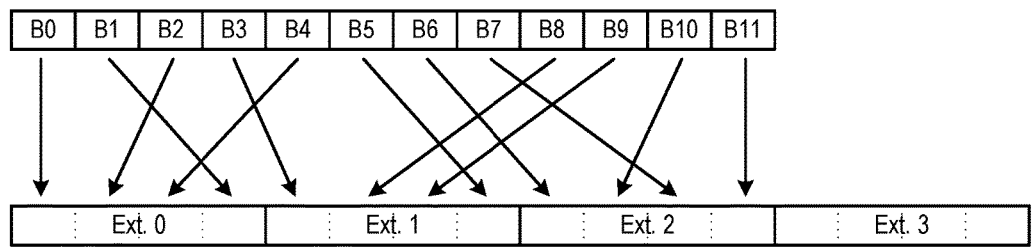
FIG. 5 is a high-level block diagram showing dynamic mapping of blocks to extents.
Figure 6:
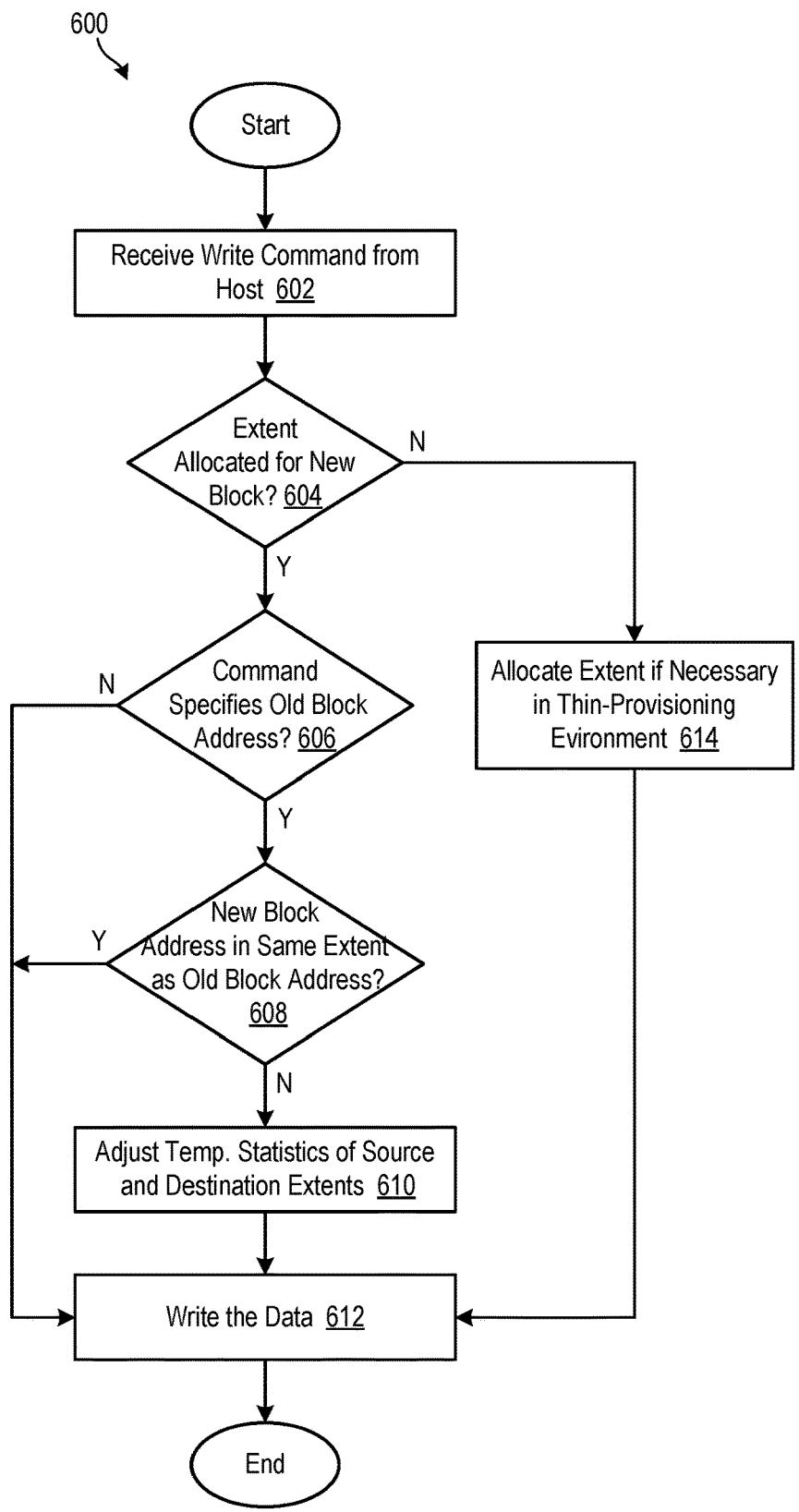
FIG. 6 is a process flow diagram showing a method for performing a write in free space in a storage environment that uses static mapping.
Figure 7:
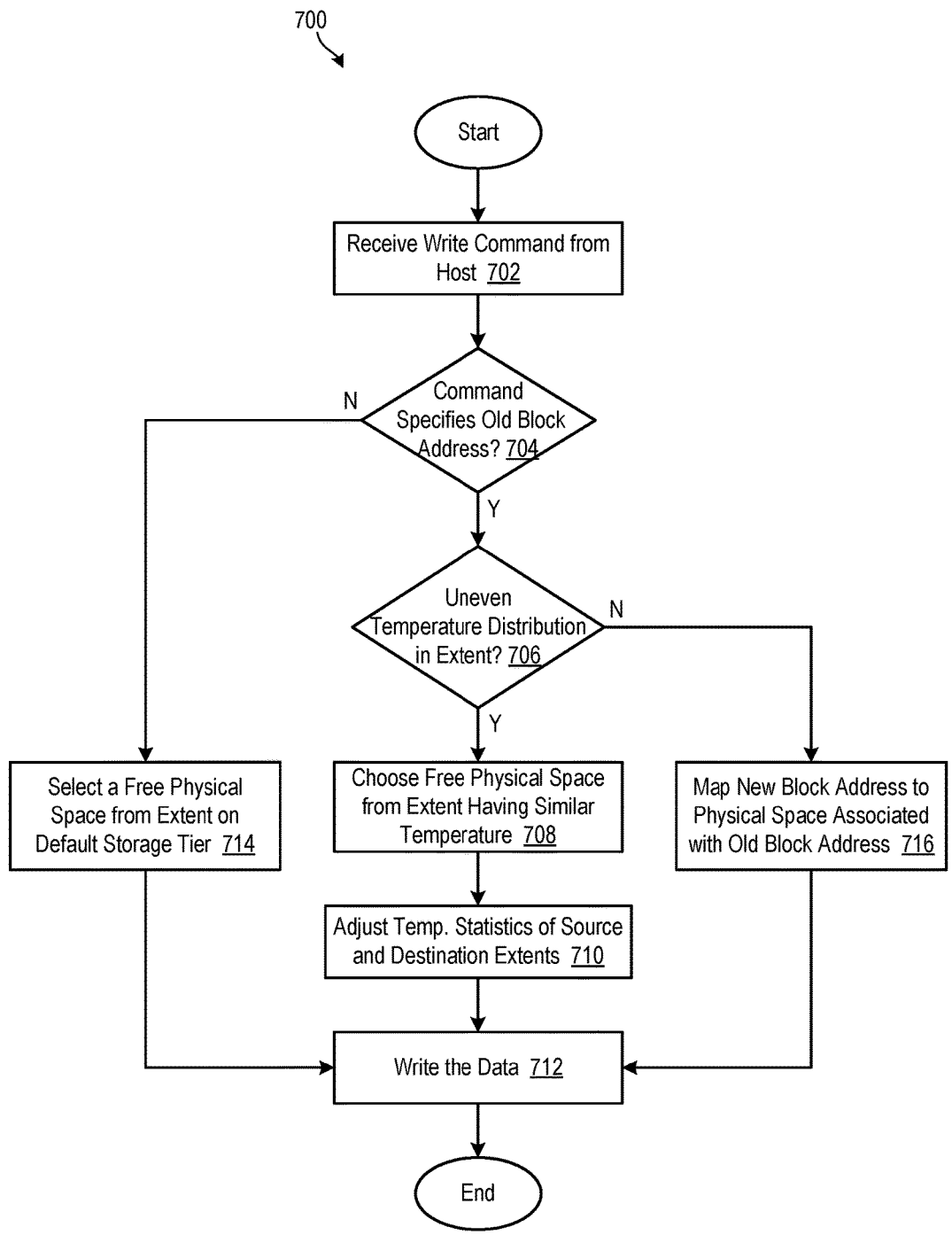
FIG. 7 is a process flow diagram showing a method for performing a write in free space in a storage environment that uses dynamic mapping.

When an application 300 sends the new write command 302 to a storage system 110 to update data in free space, a storage optimization module 304 within the storage system 110 may optimize the placement and organization of data on the underlying storage media 204. The manner in which this is performed may depend on how the storage system 110 maps block addresses to extents on the storage media 204, namely whether the storage system 110 uses static or dynamic mapping. FIG. 4 provides an example of static mapping and FIG. 6 shows how the storage optimization module 304 may process write operations on a storage system 110 that utilizes static mapping. FIG. 5 provides an example of dynamic mapping and FIG. 7 shows how the storage optimization module 304 may process write operations on a storage system 110 that utilizes dynamic mapping.

Referring to FIG. 4, a high-level block diagram is provided that shows static mapping of blocks to extents. Block addresses (which are virtual addresses) are typically maintained at the application 300 layer, whereas the physical extents represent the actual storage areas on the underlying storage media 204 in which the blocks of data are stored. In many tiered storage systems, the physical extent is the granularity of physical allocation and management for optimization. That is, when data is migrated between tiers of a tiered storage system, the data may be migrated in the unit of an extent. As shown, an extent is typically multiple times the size of a block. In the illustrated embodiment (as well as the embodiment shown in FIG. 5), each extent contains four blocks, although this number is simply presented by way of example and not limitation.

In a static mapping environment such as that shown in FIG. 4, the mapping relationship between blocks and extents may be expressed as [B-Start, B-End]→Extent Number, where [B-Start, B-End] is a range of block addresses. In the example of FIG. 4, blocks B0 through B3 map to Extent 3, blocks B4 through B7 map to Extent 0, and blocks B8 through B11 map to Extent 2. In a static mapping environment, once a block is allocated to a particular physical extent, the mapping relationship between the block and the physical extent is typically not changed.

Referring to FIG. 5, a high-level block diagram is provided that shows dynamic mapping of blocks to extents. In a dynamic mapping environment such as that shown in FIG. 5, the mapping relationship between blocks and extents may be expressed as: Block→Sub-Address of an Extent. In other words, each block may map to a block-sized division of storage space within an extent. As shown in the example of FIG. 5, block B0 maps to the first block-sized division within Extent 0, block B1 maps to the fourth block-sized division within Extent 0, block B2 maps to the second block-sized division within Extent 0, block B3 maps to the first block-sized division within Extent 1, and so forth. Using dynamic mapping, blocks may be reorganized within extents or organized to be in the same or different extents by moving data and updating the mapping relationship between the block addresses and extents.

Referring to FIG. 6, a process flow diagram showing a method 600 for performing a write in free space in a static mapping environment is illustrated. As shown, the method 600 initially receives 602 a write command from a host system 106. The method 600 then determines 604 whether an extent needs to be allocated in order to write the new block of data in free space. This step 604 applies primarily to thin-provisioned environments where space is allocated on an as-need basis. If an extent needs to be allocated to accommodate the write, the method 600 allocates 614 the extent, writes 612 the updated data to the new block address on the newly allocated extent, and the method 600 ends.

If an extent does not need to be allocated to accommodate the write command, the method 600 determines 606 whether the write command specifies an old block address for the previous version of the data. In essence, this step 606 determines whether the write command is the new write command 302 described in association with FIG. 3, or the conventional write command that does not specify an old block address. If the write command does not specify an old block address, the method 600 simply writes 612 the updated data to the extent associated with the new block address and the method 600 ends.

If, at step 606, the method 600 determines 606 that the write command 302 specifies the old block address, the method 600 determines 608 if the new block address and old block address are in the same physical extent. If so, the method 600 may write 612 the data to the new block address without modifying any temperature statistics of the extent. This is because the overall temperature statistics of the physical extent will not be affected by the write to the new block address since the temperature statistics associated with the old block address will still be reflected in the overall temperature statistics of the physical extent. Alternatively, temperature statistics associated with the old block address may be copied to the new block address to reflect the new location of the data. The temperature statistics associated with the old block address may then be cleared or reset. This, however, is not likely to affect the overall temperature statistics associated with the physical extent since the old block address and new block address are in the same physical extent.

If, at step 608, the method 600 determines that the old block address and the new block address are not in the same physical extent, the method 600 adjusts the temperature statistics of the source extent associated with the old block address and the temperature statistics of the destination extent associated with the new block address. For example, the method 600 may copy temperature statistics associated with the old block address to the new block address and reset the temperature statistics associated with the old block address. This, in turn, will adjust the temperature statistics of the source extent and the destination extent.

Referring to FIG. 7, a process flow diagram showing a method 700 for performing a write in free space in a dynamic mapping environment is illustrated. As shown, the method 700 initially receives 702 a write command from a host system 106 to update data at a new block address. The method 700 then determines 704 whether the write command specifies the old block address associated with the previous version of the data. If not, the method 700 selects 714 a free physical space from an extent on a default storage tier, maps the new block address to the free physical space, and writes 712 the data to the free physical space.

If, at step 704, the write command 302 specifies the old block address, meaning that the write command is the new write command 302 discussed in association with FIG. 3, the method 700 determines 706 whether the physical extent associated with the old block address has uneven temperature distribution (i.e., the blocks stored in the physical extent have substantially different temperatures, as determined by a threshold or other measurement). If not, the method 700 maps 716 the new block address to the physical space formerly associated with the old block address and writes 712 the updated data to this physical space. In essence, this overwrites the old version of the data with the updated data, thereby placing the updated data in the same location as the old data. In such a scenario, no adjustment of temperature statistics for the physical space or the physical extent containing the updated data is necessary since the updated data is written to the same physical location as the previous version of the data.

If, at step 706, the method 700 determines that the physical extent associated with the old block address has an uneven temperature distribution, the method 700 chooses 708 a free physical space from an extent having similar temperature characteristics as the updated data. The method 700 then adjusts the temperature statistics of the source and destination extents to reflect that the data has been moved from the source extent to the destination extent. In certain embodiments, this may be accomplished by copying temperature statistics for the physical space associated with the old block address to the physical space associated with the new block address, and resetting or clearing the temperature statistics for the physical space associated with the old block address. This will, in turn, modify the temperature statistics for the source and destination extents. The method 700 then writes 712 the updated data to the free physical space and maps it to the new block address.

The method 700 is designed to reorganize data blocks and achieve more uniform temperature distribution for blocks in each extent at the time data is written to free space in dynamic mapping environments. This will ideally lead to more optimal data placement in a tiered storage architecture and reduce scenarios where physical extents contain blocks of data with wide temperature gaps. Because data may be moved between storage tiers at the granularity of extent, this will help to ensure that more hot data is placed on faster storage media and more cold data is placed on slower and less expensive storage media when using "write in free space" (WIFS) file systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method to optimize data storage for write-in-free-space workloads, the method comprising:
   receiving a write request to write an updated version of data to a new block address in free space, the new block address mapping to a destination extent;
   determining an old block address storing a previous version of the data, the old block address mapping to a source extent;
   determining whether the source extent is the same as the destination extent;
   if the source extent is not the same as the destination extent, transferring temperature statistics associated with the old block address from the source extent to the destination extent; and
   writing the updated version of the data to the new block address.

2. The method of claim 1, further comprising, if the source extent is the same as the destination extent, leaving temperature statistics of the source extent and destination extent unchanged.

3. The method of claim 1, further comprising freeing storage space associated with the old block address.

4. The method of claim 1, further comprising allocating the new block address to a same storage tier as the old block address.

5. The method of claim 1, further comprising determining whether the source extent has substantially even temperature distribution.

6. The method of claim 5, further comprising, if the source extent does not have substantially even temperature distribution, allocating the new block address in a destination extent that is different from the source extent.

7. The method of claim 5, further comprising, if the source extent does have substantially even temperature distribution, allocating the new block address in a destination extent that is the same as the source extent.

8. A computer program product to optimize data storage for write-in-free-space workloads, the computer program product comprising a computer-readable storage medium having computer-usable program code embodied therein, the computer-usable program code configured to perform the following when executed by at least one processor:
   receive a write request to write an updated version of data to a new block address in free space, the new block address mapping to a destination extent;
   determine an old block address storing a previous version of the data, the old block address mapping to a source extent;
   determine whether the source extent is the same as the destination extent;
   if the source extent is not the same as the destination extent, transfer temperature statistics associated with the old block address from the source extent to the destination extent; and
   write the updated version of the data to the new block address.

9. The computer program product of claim 8, wherein the computer-usable program code is further configured to, if the source extent is the same as the destination extent, leave temperature statistics of the source extent and destination extent unchanged.

10. The computer program product of claim 8, wherein the computer-usable program code is further configured to free storage space associated with the old block address.

11. The computer program product of claim 8, wherein the computer-usable program code is further configured to allocate the new block address to a same storage tier as the old block address.

12. The computer program product of claim 8, wherein the computer-usable program code is further configured to determine whether the source extent has substantially even temperature distribution.

13. The computer program product of claim 12, wherein the computer-usable program code is further configured to, if the source extent does not have substantially even temperature distribution, allocate the new block address in a destination extent that is different from the source extent.

14. The computer program product of claim 12, wherein the computer-usable program code is further configured to, if the source extent does have substantially even temperature distribution, allocate the new block address in a destination extent that is the same as the source extent.

15. A system to optimize data storage for write-in-free-space workloads, the system comprising:
   at least one processor;
   at least one memory device operably coupled to the at least one processor and storing instructions for execution on the at least one processor, the instructions causing the at least one processor to:
      receive a write request to write an updated version of data to a new block address in free space, the new block address mapping to a destination extent;
      determine an old block address storing a previous version of the data, the old block address mapping to a source extent;
      determine whether the source extent is the same as the destination extent;
      if the source extent is not the same as the destination extent, transfer temperature statistics associated with the old block address from the source extent to the destination extent; and
      write the updated version of the data to the new block address.

16. The system of claim 15, wherein the instructions further cause the at least one processor to, if the source extent is the same as the destination extent, leave temperature statistics of the source extent and destination extent unchanged.

17. The system of claim 15, wherein the instructions further cause the at least one processor to free storage space associated with the old block address.

18. The system of claim 15, wherein the instructions further cause the at least one processor to allocate the new block address to a same storage tier as the old block address.

19. The system of claim 18, wherein the instructions further cause the at least one processor to determine whether the source extent has substantially even temperature distribution.

20. The system of claim 18, wherein the instructions further cause the at least one processor to:
   if the source extent does not have substantially even temperature distribution, allocate the new block address in a destination extent that is different from the source extent; and
   if the source extent does have substantially even temperature distribution, allocate the new block address in a destination extent that is the same as the source extent.

\* \* \* \* \*